United States Patent [19]
Vick

[11] Patent Number: 5,414,511
[45] Date of Patent: May 9, 1995

[54] DUAL OPTICAL AMPLIFIER RING LASER GYROSCOPE WITH REDUCED PHASE LOCKING

[75] Inventor: Gerald L. Vick, Mt. Vernon, Iowa

[73] Assignee: Rockwell International Corporation, Seal Beach, Calif.

[21] Appl. No.: 582,738

[22] Filed: Sep. 14, 1990

[51] Int. Cl.⁶ ............................ G01B 9/02; H01S 3/00
[52] U.S. Cl. ...................................... 356/350; 359/346
[58] Field of Search ......................... 356/350; 330/4.3; 359/346

[56] References Cited
U.S. PATENT DOCUMENTS
4,258,336 3/1981 Fletcher et al. ................ 356/350

OTHER PUBLICATIONS
J. Chesnoy, Optics Let, vol. 14, No. 8, Sep. 1989.

Primary Examiner—Stephen C. Buczinski
Attorney, Agent, or Firm—Gregory G. Williams; M. Lee Murrah; H. Fredrick Hamann

[57] ABSTRACT

An active ring laser gyroscope having two optical amplifier diodes therein which are switched in such a fashion that the two counter propagating light pulses in the ring are never in an activated optical amplifier diode at the same time.

3 Claims, 1 Drawing Sheet

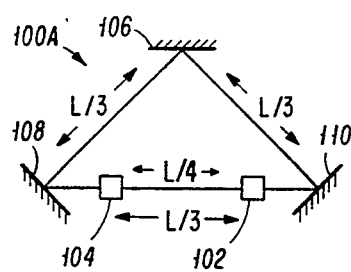

FIG. 1A

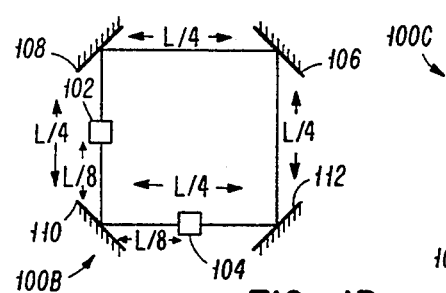

FIG. 1B

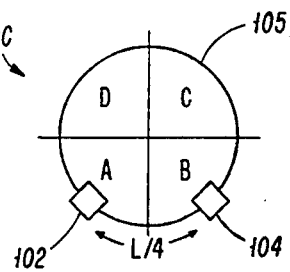

FIG. 1C

| OPTICAL CYCLE | TIME | SOA STATE | | LIGHT BEAM LOCATION /(STATUS) | | | | | | | |
|---|---|---|---|---|---|---|---|---|---|---|---|
| | | A (102) | A (104) | CWA1 | CCWA1 | CWB1 | CCWB1 | CWA2 | CCWA2 | CWB2 | CCWB2 |
| 0 | 0 | ON | OFF | A | A | | | | | | |
| | 1 | OFF | ON | D | B/(P) | B | B | | | | |
| | 2 | OFF | ON | C | C | A/(X) | C | | | B | B |
| | 3 | ON | OFF | B/(X) | D | D | D | A | A | A/(P) | C |
| 1 | 4 | ON | OFF | A | A/(P) | C | A/(P) | D | B/(X) | D | D |
| | 5 | OFF | ON | D | B/(P) | B/(P) | B/(P) | C | C | C | A/(X) |
| | 6 | OFF | ON | C | C | A/(X) | C | B/(P) | D | B/(P) | B/(P) |
| | 7 | ON | OFF | B/(X) | D | D | D | A/(P) | A/(P) | A/(P) | C |
| 2 | 8 | ON | OFF | A/(P) | A/(P) | C | A/(P) | D | B/(X) | D | D |
| | 9 | OFF | ON | D | B/(P) | B/(P) | B/(P) | C | C | C | A/(X) |
| | 10 | OFF | ON | C | C | A/(X) | C | B/(P) | D | B/(P) | B/(P) |
| | 11 | ON | OFF | B/(X) | D | D | D | A/(P) | A/(P) | A/(P) | C |
| | 12 | ON | OFF | A/(P) | A/(P) | C | A/(P) | D | B/(X) | D | D |
| | • | | | | | | | | | | |
| | • | | | | | | | | | | |
| | • | | | X | | X | | | X | | X |
| N | L/N | ON | OFF | | A/(P) | | A/(P) | D | | D | |
| | L/N+1 | OFF | ON | | B/(P) | | B/(P) | C | | C | |
| | L/N+2 | OFF | ON | | C | | C | B/(P) | | B/(P) | |
| | L/N+3 | ON | OFF | | D | | D | A/(P) | | A/(P) | |

FIG 2

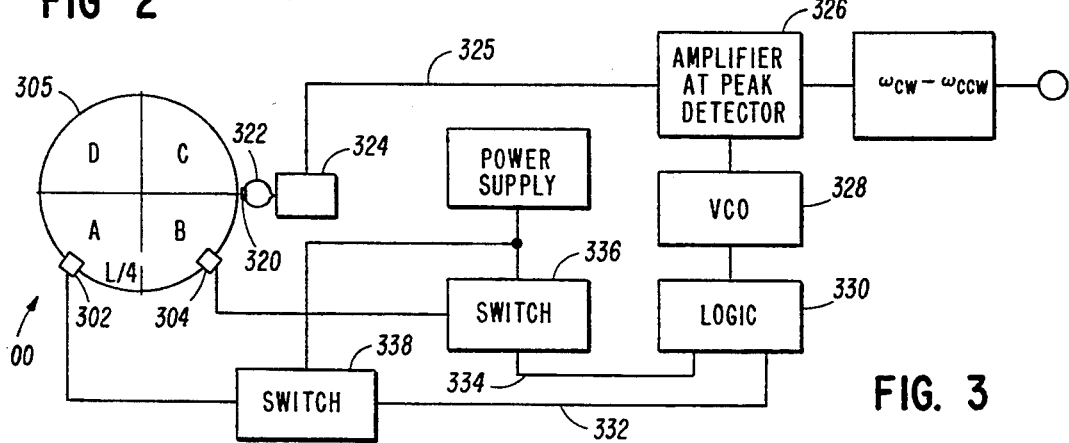

FIG. 3

DUAL OPTICAL AMPLIFIER RING LASER GYROSCOPE WITH REDUCED PHASE LOCKING

FIELD OF THE INVENTION

The present invention generally relates to ring laser gyroscopes and more particularly relates to active ring laser gyroscopes having an optical amplifier diode therein, and even more particularly, concerns active ring laser gyroscopes having dual optical amplifier diodes.

BACKGROUND OF THE INVENTION

In recent years, the aviation industry has been involved in a seemingly never ending quest to enhance the performance of modern avionics. One particular area in which avionics engineers have expended much effort, and achieved many successes, is in the substitution of completely electro-optical systems for the conventional mechanical systems of the past. A prime example of these efforts is in the area of inertial navigation systems.

Mechanical gyroscopes have been, for years, a central component to any inertial navigation system. Recently, the Helium-Neon (He-Ne) ring laser gyroscope has replaced many of the mechanical gyros. However, these He-Ne ring laser gyros have several disadvantages, including size, cost and weight. With the recent advent of the Global Positioning System, which utilizes satellite communications to assist inertial navigation systems, the fiber optic ring laser gyro is becoming an attractive component in modern inertial navigation systems.

A common problem appearing in any active ring laser gyroscope is phase locking between the counterpropagating beams. This phase locking often makes it difficult or impossible to detect low rotation rates.

One attempt to reduce the phase lock problem is discussed in U.S. Pat. No. 4,258,336 issued to Paul C. Fletcher, et al. and is entitled "Pulsed Ring Laser Gyro" and was issued on Mar. 24, 1981. This patent is hereby incorporated herein by this reference.

A major problem with the Fletcher approach is that it appears that several optical pulses will be oscillating in different modes in the optical cavity. This is a source of random variation or noise which has serious adverse effects on the operation of the gyroscope.

Consequently, there exists a need for an improved active ring laser gyroscope with reduced noise and concomitantly enhanced ability to detect low rotation rates.

SUMMARY OF THE INVENTION

It is an object of the present invention to provide an active ring laser gyroscope with enhanced ability to detect low rotation rates.

It is a feature of the present invention to utilize dual optical amplifiers separated by a distance of one fourth of the distance around the entire ring.

It is an advantage of the present invention to achieve a substantial reduction in optical noise existing in the optical cavity of the ring laser.

It is another object of the present invention to provide a low cost gyroscope.

It is another feature of the present invention to include a variable clock frequency for switching the optical amplifiers, in combination with a feedback element from the optical detector.

It is another advantage of the present invention to allow for the elimination of a fixed frequency standard.

The present invention provides an active ring laser gyroscope having dual optical amplifiers, that is designed to fulfill the aforementioned needs, satisfy the earlier propounded objects, include the above described features, and achieve the previously stated advantages. The invention is carried out in a "optical noiseless" in the sense that the optical noise existing in the present cavity due to various pulses at different optical frequencies have been greatly reduced. Instead, a ring laser gyroscope is provided having persisting therein only a single clockwise beam and a single counterclockwise beam.

Accordingly, the present invention includes an active ring laser gyroscope having dual optical amplifiers separated by a distance equal to one fourth of the overall distance around the ring laser and further providing a clock frequency and feedback element for controlling the switching of the dual optical amplifiers.

BRIEF DESCRIPTION OF THE DRAWINGS

The invention may be more fully understood by reading the following description of a preferred embodiment of the invention in conjunction with the appended drawings wherein:

FIG. 1A is a schematic representation of a triangular shaped active ring laser of the present invention having dual optical amplifiers therein which are separated by a distance of one fourth of the entire distance around the ring laser.

FIG. 1B is a schematic representation of an active rectangular ring laser, of the present invention, having dual optical amplifiers therein separated by a distance of one fourth of the entire distance around the ring laser.

FIG. 1C is a schematic representation of a circular fiber optic active ring laser, of the present invention having dual optical amplifier diodes separated by a distance equivalent to one fourth of the entire distance around the ring laser.

FIG. 2 is a table showing the status of light beams in conjunction with the state of operation of the dual optical amplifiers over a series of many cycles.

FIG. 3 is a schematic representation of an active ring laser gyro, of the present invention, having a feedback loop and switching circuitry of the present invention for switching the dual optical amplifiers.

DETAILED DESCRIPTION

Now referring to FIG. 1A, there is shown a triangular dual optical amplifier active ring laser, of the present invention, generally designated 100A. Also shown are optical amplifiers 102 and 104 which are separated by a distance L/4. Optical amplifiers 102 and 104 are disposed between mirrors 108 and 110 which are separated by a distance L/3. Furthermore, mirror 106 is separated from mirrors 108 and 110 by a distance L/3. Consequently, the total distance of the light path around the active ring laser 100A is 3L/3 or L while the separation between the optical amplifiers is L/4.

Now referring to FIG. 1B there is shown rectangular active ring laser, of the present invention, generally designated 100B. Also shown are mirrors 106, 108, 110, and 112 which are disposed in a rectangular array wherein the separation distance between each is L/4. Optical amplifiers 104 and 102 are shown disposed at a distance of L/8 on opposite sides of the light path extending from mirror 110. The total separation between optical amplifiers 102 and 104 is L/4.

Now referring to FIG. 1C there is shown a circular active fiber optic ring laser, of the present invention. The ring laser 100C is divided into four equal quadrants A, B, C and D. Optical amplifiers 102 and 104 are shown separated by a distance of L/4 when the entire optical fiber length 105 is equal to L. The optical amplifiers 102 and 104 are located in the centers of quadrants A and B. If the fiber 105 has length L, then the transient time around the ring laser will be:

$$t = \frac{nL}{c}$$

wherein n is the index of refraction and c is the velocity of light in free space. For convenient illustration purposes only, we will consider the length L to be equal to 80 cm for which the transient time is 4 nanoseconds (ns). Of course, longer or shorter lengths may be used, but as L increases, problems with coherence length and close mode spacing begin to appear. Also as L decreases the transient time t becomes shorter, thus increasing the switching frequencies of the optical amplifiers.

In operation, the ring laser of the present invention may be more fully understood by considering a clock circuit with a period of one nanosecond which turns optical amplifiers A and B on and off in accordance with the table shown in FIG. 2. Clockwise and counterclockwise light beams will be emitted and passed or amplified when their arrival at an optical amplifier diode coincides with that optical amplifier diode being switched on and will, conversely, be blocked or severely attenuated when their arrival coincides with the optical amplifier being in the off state.

The principle behind the present invention is that phase locking can be reduced by spatially separating the counterpropagating light beams, such that the two counterpropagating light pulses are never present in the amplifying medium at the same time. This is done with the configurations shown in FIGS. 1A, 1B, and 1C where the optical amplifiers 102 and 104 are switched in accordance with the table of FIG. 2.

Now referring to FIG. 2, column 1 lists the optical cycle or number of transients around the loop for a single photon. After the first few cycles, the number N, shown at the bottom of column 1, is of no importance.

Column 2 is a sequential numbering of measured time units of one fourth of the transient time t. In the case of the present example each unit is one nanosecond. The time units begin with numeral 0 and continue to 4N+3.

Columns 3 and 4 indicate the state (whether on or off) of the two optical amplifier diodes 102 (A) and 104 (B).

Columns 5 through 12 represent the location or status of light beams in a particular quadrant of FIG. 1C.

Column 5 represents the location of a first clockwise propagating light beam which eminates from optical amplifier A and is labeled CWA1. For example in row 0, or the starting configuration for the ring laser, Column 5 shows that the first clockwise light beam is located in quadrant A. This is the case because the light pulses are emitted from optical amplifier A when it is switched to the on state. Similarly, Column 6 shows a counterclockwise light beam eminating from optical amplifier A and it is located in quadrant A. During time interval 1 the first clockwise light pulse emitting from optical amplifier A has moved to the D quadrant and the first counterclockwise light pulse emitting from optical amplifier A has moved to the B quadrant. During this time interval 1 the A optical amplifier is in the off state and the B optical amplifier is in the on state. Consequently, the counterclockwise light beam emitting from optical amplifier A which has progressed from quadrant A into quadrant B, and thereby into optical amplifier B, will pass through optical amplifier B because of its on state. This passing of the light pulse through the optical amplifier B is denoted in Column 6 as "B/(P)" which shows that the pulse is located in the B quadrant and the P designation showing that the pulse passes through optical amplifier B because of its on state. Because of the on state of optical amplifier B two new pulses are emitted in opposite directions from optical amplifier B and their location and status are charted in Columns 7 and 8. For example, Column 7 shows the location/status of the first clockwise propagating light pulse eminating from optical amplifier B while Column 8 in time interval 1 shows the first counterclockwise propagating light pulse eminating from optical amplifier B. During time interval 2, Columns 3 and 4 clearly show that optical amplifier A is in the off state while optical amplifier B is in the on state. The first clockwise propagating light pulse which eminated from optical amplifier A during time interval 0 has now progressed to the C quadrant and similarly the first counterclockwise propagating light pulse eminating from optical amplifier A is also located in the C quadrant. In other words two time cycles, or one-half of the transit time, have elapsed and the pulses which eminated from optical amplifier A have now progressed halfway around the loop to quadrant C. For time interval 2 there is also shown in Column 7 the location and status of the first clockwise propagating light pulse which eminated from optical amplifier B in the time interval 1 immediately proceeding. Column 7 contains a designation of "A/(X)" which shows that the light pulse is located in quadrant A and the X denotes that the pulse is eliminated or extremely attenuated do to the off state of optical amplifier A. Column 8 shows the location of the first counterclockwise propagating light pulse eminated from optical amplifier B during time interval 1. During time interval 2 the optical amplifier B is in the on state which necessarily results in the emission of two additional and counter-propagating light pulses from optical amplifier B. The position of these light pulses is denoted in Column 11 and 12 where Column 11 shows the second clockwise propagating light pulse eminating from optical amplifier B and Column 12 shows the second counterclockwise propagating light pulse eminating from optical amplifier B. During time interval 3, optical amplifier A is in the on state and optical amplifier B is in the off state. Column 5 contains a designation "B/(X)" which shows that the first clockwise propagating light pulse, which had eminated from optical amplifier A during time interval 0, has now progressed to quadrant B and is coincident with optical amplifier B. The X designation shows that the light pulse is extinguished at this point because of the off state of amplifier B. The first counterclockwise propagating light pulse which eminated from optical amplifier A during time interval 0 has now progressed to quadrant D which is clearly shown in Column 6. Column 7 shows that the first clockwise propagating light pulse which eminating from optical amplifier B during time interval 1 would be at quadrant D. However, since this first clockwise propagating light pulse, which eminated from optical amplifier B was extinguished during time interval 2 at quadrant A there is virtually no pulse present at location D. Column 8 shows that the location of the first counterclockwise propagating light pulse which eminated from optical amplifier B during time interval 1 has progressed to quadrant D. Columns 9 and 10 show the location of the newly emitted counterpropagating pulses from optical amplifier A due to the on state of optical amplifier A during time interval 3. Column 11 shows the second clockwise propagating light pulse, which eminated from optical amplifier B during time interval 2 has progressed to quadrant A and will pass through optical amplifier A. Column 12 shows that the second counterclockwise light pulse which eminated from optical amplifier B has now progressed to quadrant C.

Further understanding of the present invention may be facilitated by reviewing time intervals 4 through 12 and FIG. 2.

In order for the ring laser to function properly, it is desirable that there exists only one pair of counterpropagating light pulse which persist throughout the duration of the ring laser operation. A quick review of column 5 shows that the light pulse which is tracked in that column does not persist, because it is extinguished whenever it reaches a B optical amplifier in the off state. Column 6 shows that the light pulse tracked therein is one that persists throughout the operation of the ring laser because there are no Xs. Column 7 is similar to Column 5, in that the pulse is extinguished when it encounters an optical amplifier in the off state. The light pulse tracked in column 8 shows that it persists through the entire operation of the gyro. Similarly, the light pulse tracked in Column 9 persists. The light pulses tracked in Column 10 and 12 however are extinguished upon encountering optical amplifiers in the off state and are clearly designated as such because of the Xs appearing in Columns 10 and 12. The light pulse being tracked in Column 11 also persists through the operation of the ring laser.

It may appear that there are two pairs of counterpropagating pulses which are allowed to persist in the ring laser throughout it operation. However, upon closer inspection it is readily apparent that the light pulses which are tracked in Columns 6 and 8 are both counterclockwise and are co-located. Consequently, they are viewed as a single counterclockwise propagating pulse. The clockwise light pulses which are tracked in Columns 9 and 11 are also co-located and therefore constitute one clockwise light pulse.

As stated earlier the present invention which has a significant reduction in phase locking by spacially separating the counterpropagating light beams, so that, these counterpropagating light pulses are never present in the amplifying medium at the same time. Consequently, the phase locking, which would commonly occur when two pulses are located in active medium at the same time, is eliminated.

Now referring to FIG. 3 there showing an active ring laser gyroscope, of the present invention, generally designated 300. Gyroscope 300 is shown having a circular optical fiber 305 with optical amplifiers 302 and 304 disposed therein. A circular fiber optic ring laser is shown but triangular, square, or other active ring laser gyroscopes are contemplated. Optical amplifier 302 is separated from optical amplifier 304 by a distance of L/4 when the overall length of optical fiber 305 is L. The switching of optical amplifiers 302 and 304 is preferably performed in accordance with the chart of FIG. 2 and may be accomplished by the clock circuitry shown herein. The counterclockwise propagating pulses are coupled out of optical fiber 305 by optical coupler 320 and provided to photodetector 324 by optical fiber 322. Preferably, the optical coupler 320 is located at the boundary between quadrants B and C. However, the coupler 320 could be located at another location, but it would then be necessary to adjust the length of optical fiber 322 in order to provide an appropriate delay line, so that, the two pulses arrive at the detector 324 at the same time. Photodetector 324 detects the combined clockwise and counterclockwise light pulses. The output of detector 324 is characterized by an analog amplitude and a beat frequency. This beat frequency constitutes the rotation detection signal and is sent to the output terminal via line 325. The amplitude is used to control a VCO 328, which preferably operates at a nominal frequency of four times the optical resonance frequency of the fiber optic loop (Wopt) a logic circuit 330 is coupled with the VCO 328 and is used to make the two switches 336 and 338 switch on and off in the sequence indicated and FIG. 2 at the VCO frequency. This applies the power supply to which ever optical amplifier is in the on stage, causing it to amplify any light pulse located therein at the time.

In operation, the ring laser gyroscope of the present invention is accomplished by switching the optical amplifiers 302 and 304 in the sequence as provided in FIG. 2 and further manipulating the switching frequency of these optical amplifiers by detecting, through detector 324, the peak amplitude which is emitted from the photodetector, which corresponds to the most powerful counterpropagating pulses in the optical fiber loop. This detection of the peak amplitude is used to drive the switches at the appropriate frequency in order to maximize the power output of the ring laser.

It is thought that the ring laser gyroscope of the present invention and many of its attendant advantages we understood from the foregoing description, and it will be apparent that various changes may be in the form, contruction, and the arrangement of the parts, without departing from the spirit and scope of the invention, or sacrificing all of there material advantages, the form described here and being merely preferred or exemplary embodiments thereof.

I claim:

1. An improved active ring laser gyroscope comprising:

an optical fiber providing for the transmission of light pulses therethru;

a first optical amplifier diode, having an on state and an off state, coupled with said optical fiber for generating and amplifying light pulses during an on state in said optical fiber;

a second optical amplifier diode coupled with said optical fiber for generating and amplifying light pulses during an on state in said optical fiber;

said optical fiber having a predetermined length;

said first optical amplifier and said second optical amplifier being separated by a distance of one fourth of said predetermined length; and means for switching said first optical amplifier and said second optical amplifier from on and off states, so that, said first optical amplifier is never in an on state when said second optical amplifier is also in an on state and so that pairs of counter propagating light pulses are caused to be generated at equal time intervals in the optical fiber and further so that a single persisting clockwise light pulse and a single persisting counter-clockwise light pulse continuously persist in the optical fiber and further so that said single persisting clockwise light pulse is caused to be amplified each time it encounters said first optical amplifier and said second optical amplifier.

2. A gyroscope of claim 1 further comprising an optical coupler coupled with said optical fiber for extracting light pulses from said optical fiber.

3. A gyroscope of claim 2 further comprising an optical detector coupled with said optical coupler for analyzing light pulses.

* * * * *